United States Patent [19]

Lang

[11] Patent Number: 4,963,995

[45] Date of Patent: Oct. 16, 1990

[54] AUDIO/VIDEO TRANSCEIVER APPARATUS INCLUDING COMPRESSION MEANS

[75] Inventor: Richard A. Lang, Cave Creek, Ariz.

[73] Assignee: Explore Technology, Inc., Scottsdale, Ariz.

[21] Appl. No.: 289,776

[22] Filed: Dec. 27, 1988

[51] Int. Cl.$^5$ .............................................. H04N 5/76
[52] U.S. Cl. .................................... 358/335; 358/133; 360/8; 360/9.1; 360/14.1
[58] Field of Search .................. 360/9.1, 55, 13, 14.1, 360/8; 358/335, 903, 901, 133

[56] References Cited

U.S. PATENT DOCUMENTS

| | | | |
|---|---|---|---|
| 4,179,709 | 12/1979 | Workman | 358/133 |
| 4,446,490 | 5/1984 | Hoshimi | 360/13 |
| 4,511,934 | 4/1985 | Ohira | 360/55 |
| 4,516,156 | 5/1985 | Fabris et al. | 358/85 |
| 4,563,710 | 1/1986 | Baldwin | 360/9.1 |
| 4,625,080 | 11/1986 | Scott | 360/33.1 |
| 4,698,664 | 10/1987 | Nichols | 360/14.1 |
| 4,750,034 | 6/1988 | Lem | 358/335 |
| 4,768,110 | 8/1988 | Dunlap et al. | 360/33.1 |
| 4,774,574 | 9/1988 | Daly et al. | 358/133 |
| 4,851,931 | 7/1989 | Parker et al. | 360/115 |

Primary Examiner—Robert L. Richardson
Attorney, Agent, or Firm—William E. Hein

[57] ABSTRACT

An improved video recorder/transmitter with expanded functionality including a capability for editing and/or copying from one video tape to another using only a single tape deck. The increased functionality is realized through the use of analog to digital conversion, signal compression and intermediate storage in an integrated circuit, random access memory. The recorder/transmitter has capabilities to transmit and receive program information in either a compressed or decompressed format over fiber optic lines.

80 Claims, 2 Drawing Sheets

AUDIO/VIDEO TRANSCEIVER APPARATUS INCLUDING COMPRESSION MEANS

BACKGROUND OF THE INVENTION

The video cassette recorder (VCR) has added significantly to the usefulness of the home television set. Important or exceptionally good programs may be recorded to be viewed again. Programs appearing at times that are inconvenient for viewing may be recorded for playback at a better time. Recorded movies or other materials, educational or entertaining, may be rented or borrowed for viewing at home. (As used in the remainder of this specification, the term "program" encompasses movies and other types of video materials, whether broadcast from a TV station or another source.)

The typical VCR has its own tuner-receiver and a video-recorder. It can receive and record a program from one channel while the television set is being employed to view a program on another channel. Programs are recorded on magnetic tape. The tape is then played back and viewed on the television set. Features commonly included in the VCR are capabilities for advancing the tape forward or backward at a high speed, stopping motion at any frame to hold the image, or simply playing back the recording at normal speed.

Desirable features that are not normally available in a VCR are capabilities for copying recorded programs from one tape or alternative storage medium to a similar or dissimilar storage medium, editing recorded programs and high speed recording. Another desirable but currently unavailable feature is the capability for high speed, high quality transmission and reception by optical fiber using the VCR.

DESCRIPTION OF THE PRIOR ART

U.S. Pat. No. 4,768,110 incorporated herein by reference, describes a VCR having two tape decks included therein. The purpose for the inclusion of two decks rather than the usual single tape deck is to permit the simultaneous viewing of a live RF-modulated TV signal or prerecorded material while recording another live RF-modulated TV signal and to also allow the copying of material from a first magnetic cassette tape onto a second magnetic cassette tape without the use of a second VCR. Viewing of the recorded material during the copying process is also possible in this arrangement. A major disadvantage is that the incorporation of the second tape deck is expensive and limited to magnetic tape, and furthermore, this prior art does not allow for the transmission or reception of recorded material over optical fibers or the high speed reception or transmission of audio/video material in a digital format. An additional disadvantge is the inability for random access editing of the audio/video signal. Furthermore, the additional mechanical structure adds significantly to the overall dimension of the equipment and increases the prospects of mechanical failures.

SUMMARY OF THE INVENTION

In accordance with the invention, an improved audio/video recorder is provided with added features and functions which significantly enhance its usefulness and functionality.

It is, therefore, an object of the present invention to provide an improved audio/video recorder for use in conjunction with an ordinary home television set.

Another object of the invention is to provide in such an improved audio/video recorder a capability for transferring a previously recorded program from one magnetic tape or other storage medium to another.

A further object of the invention is to provide such a capability for transferring a recorded audio/video program without resort to the use of two magnetic tape decks, this being a cumbersome, limited, and expensive approach already proposed in the prior art.

A still further object of the invention is to provide an effective and efficient means for intermediate storage of the audio/video program in digital memory as a means for achieving the transfer of the audio/video program from one tape or storage medium to another.

A still further object of the invention is to provide in such an improved audio/video recorder a capability for accepting various forms of analog or digital audio and video input signals and for converting the analog input signals to digital form when appropriate.

A still further object of the invention is to provide in such an improved audio/video recorder a capability for editing the video input signals without the necessity of using multiple cassettes or recording media.

A still further object of the invention is to provide an improved audio/video recorder for connection to various signal sources including a TV RF tuner, video camera, video line input, and direct audio/video digital input from sources as diverse as a fiber optic input line or a computer.

A still further object of the invention is to provide an improved audio/video recorder having a capability for mixing live audio/video programs with either analog or digital audio/video input signals from another source.

A still further object of the invention is to provide an improved audio/video recorder for simultaneously playing, viewing, recording and/or mixing digital and analog audio/video programs from different digital and analog audio/video sources or storage media.

A still further object of the invention is to provide an improved audio/video recorder which maximizes a given storage capacity, through the use of a data compression technique.

A still further object of the invention is to provide an audio/video recorder utilizing a data compression technique for efficient storage, transmission, and reception of a digitized audio/video program over telephone lines or by other external digital means such as satellite transmission or reception.

A still further object of the invention is to provide in such an improved audio/video recorder a capability for delivering output signals in different forms or formats including a standard RF modulated output signal for viewing on a television set, a digital output signal for viewing on a high-resolution monitor, and audio output signals for a speaker system.

A still further object of this invention is to provide an improved audio/video recorder which provides for random access to any given segment of a self-stored audio/video program so that the desired segment may be accessed and viewed without the time-consuming delays normally involved in fast-forward or fast-reverse searching procedures employed in present state-of-the-art VCR's.

A still further object of the invention is to provide an improved audio/video recorder which provides convenience in the editing of stored data by virtue of its random access memory capability.

A still further object of the invention is to provide an improved audio-video recorder which has the potential for enhanced audio and video quality by virtue of its capability for digital audio/video output and digital filtering techniques.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWING

The present invention may be more readily described with reference to the accompanying drawing, in which.

DESCRIPTION OF THE PREFERRED EMBODIMENT

Figures 1, 1A:
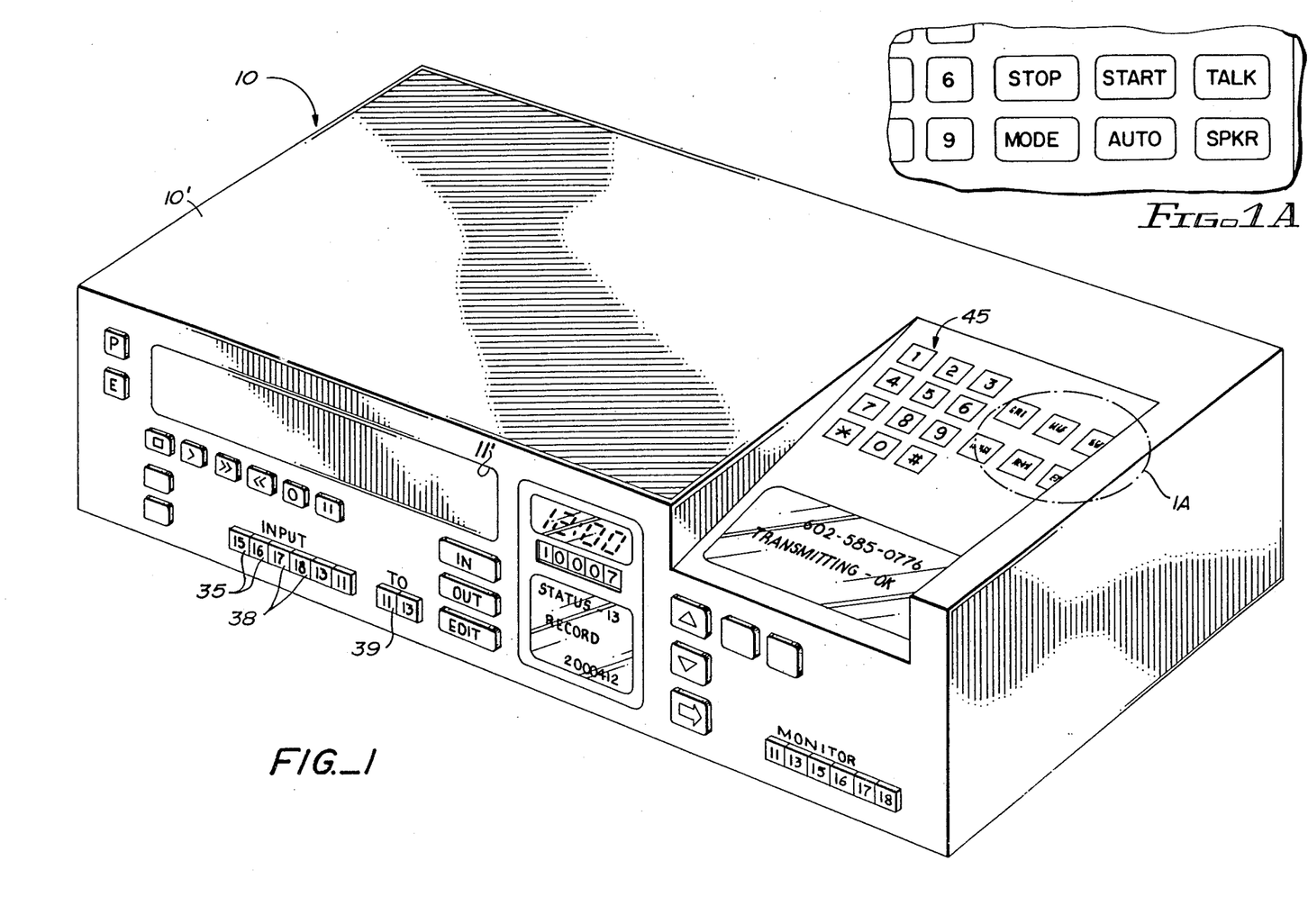
FIG. 1 is a perspective view of the housing of the audio/video recorder disclosed and embodying the invention.
FIG. 1A is an enlarged view of the circled area of FIG. 1.
Figure 2:
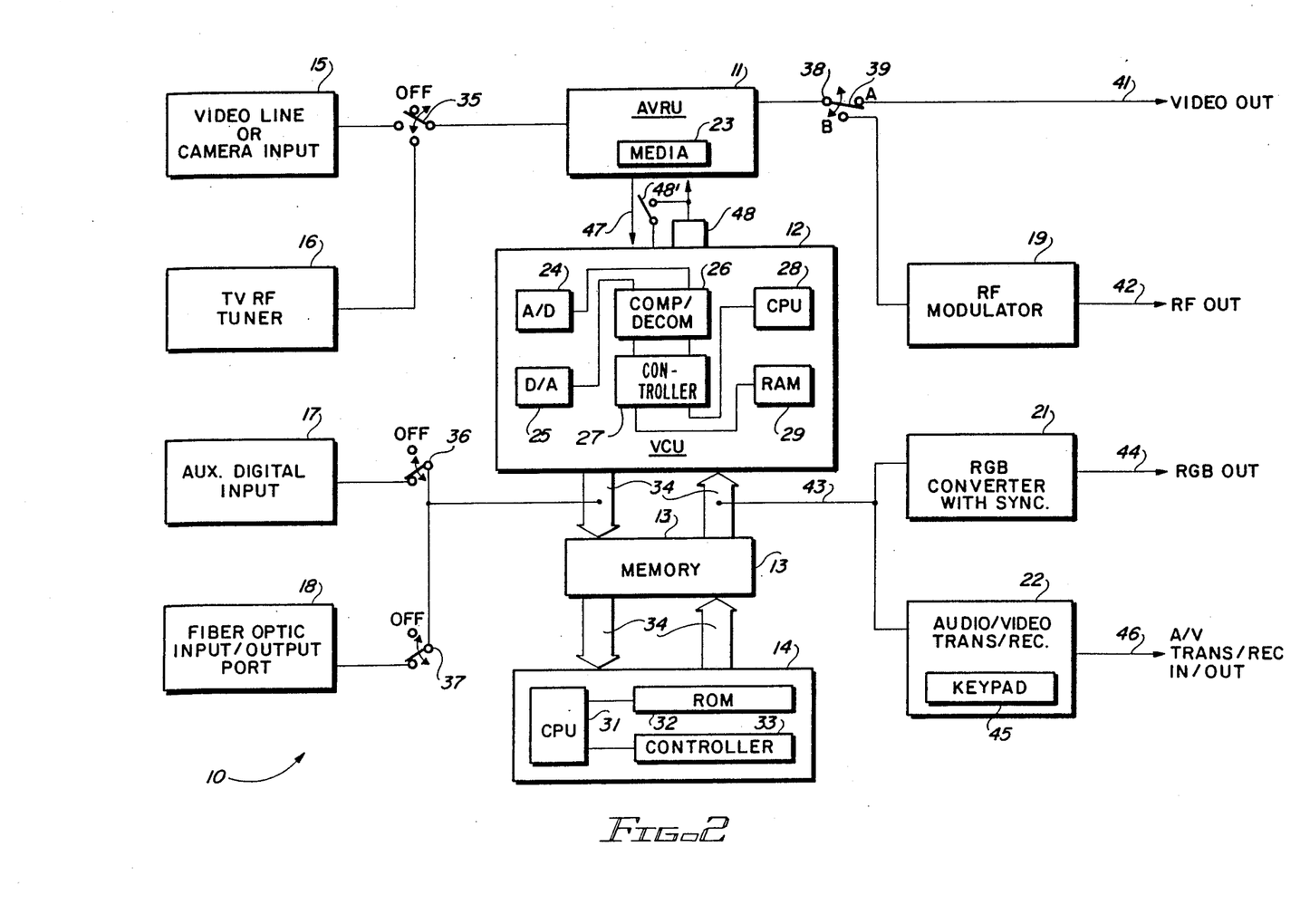
FIG. 2 is a functional block diagram of the audio/video recorder of FIG. 1.

Referring to the drawing by characters of reference, FIGS. 1 and 2 illustrate an improved audio/video recorder transmitter-editor 10 (the "VCR-ET") comprising an audio/video recording unit (AVRU) 11, a video control unit (VCU) 12, memory 13, digital control unit (DCU) 14, video line or camera input line 15, TV RF tuner 16, auxiliary digital input port 17, fiber optic input/output port 18, RF modulator 19, RGB converter with syncronizer 21, and an audio/video transmitter/receiver 22 with keypad 45, all in a common housing.

The audio/video recording unit AVRU 11 may be a video cassette recorder similar to a conventional VCR in which the storage media 23 is a magnetic tape. Alternatively AVRU 11 may operate with other types of storage media including, but not limited to, other magnetic tape formats. AVRU 11 has all the functions of the typical VCR including record, play, rewind, slow motion, fast-forward and single frame hold.

An alternate form of storage media for use in AVRU 11 is the CD-ROM, which is a disk using a derivative of glass or plastic in conjunction with an aluminum or other metallic coating. Audio and video signals are stored in the form of irregularities in the aluminum coated surface and are read using a low power laser. In this case, the user would not be able to store or write into the CD-ROM but would be able to play discs that have been recorded and distributed commercially. The storage of video and audio signals on the CD-ROM is in digital form which is readily accommodated by the video recorder of this invention.

Instead of using a CD-ROM, VCR-ET 10 can achieve both record and play capabilities by using optical discs as media 23. Such optical discs are similar to a CD-ROM and use a variable power laser to read from or write on the disc.

A first type of optical disc may comprise a WORM (Write Once Read Many) optical disc. This device has the unique capability of writing on the disc permanently. A laser is used to burn a pit in the media or to change the magnetic or optical properties of the media. A lower-powered laser is then used to read the data from the disc. Data, in this case, is permanently recorded; it may neither be erased nor written over. A further description of this technology can be found in the November 1988 issue of *The Electronic System Design* magazine (ESD) page 55–56.

A second and preferred type of optical disc to be used in AVRU 11 is an erasable optical disc. This disc has full read/write/erase capabilities. With this disc, AVRU 11 has the same record/playback capabilities as a conventional VCR. As an example, erasable optical discs are used in Steven Jobs' "Next" machine as described in *Infoworld*, Volume 10, issue 42, pages 51 and 93, Oct. 17, 1988. In addition, the digital format and the random access capabilities of the erasable disc (and of the CD-ROM and WORM) provide additional benefits as will be discussed in a later part of this specification.

A key element of VCR-ET 10, which is responsible for its improved functionality, is the video control unit or VCU 12. The VCU comprises an analog to digital converter (ADC) 24, a digital to analog converter (DAC) 25, a compressor/decompressor 26, a controller 27, a central processing unit (CPU) 28 and a random access memory (RAM) 29. VCU 12, using these elements, accomplishes the digitization and compression of analog signals as well as the reverse process in which the compressed digital signals are decompressed and converted back to analog signals.

As a first step in the processing of the composite video signals within VCU 12, the sync signals are decoded to isolate signals for each picture frame for processing.

The video signals defining each frame may then be converted to a red analog signal, a green analog signal, and a blue analog signal in a conventional manner. The red, green and blue analog signals are then converted to digital form by the analog to digital converter (ADC) 24. The frame is divided into a set of closely positioned rows and columns of picture elements or "pixels." Each pixel has a color defined by a set of three digital values defining strength of the primary color components, red, green and blue (RGB) respectively. In one embodiment, each frame is divided into an array of 300 by 300 pixels, with the color and luminance of each pixel being defined by a seven bit word for the red component, a seven bit word for the blue component, and a seven bit word for the green component. These words are generated by ADC 24.

If each frame includes 90,000 pixels (300×300), and each pixel is defined by 21 bits (7 bits per primary color), the digital representation of a single video frame utilizes a sizable block of digital information (i.e., 1.89 megabits/frame) which must be processed very rapidly. (Approximately 30 frames/second are received from AVRU 11.) Fortunately the analog to digital conversion of these signals may be accomplished at the desired speed using commercially available analog to digital converter integrated circuits. The analog to digital converter 24 (ADC) is a high-speed, high-accuracy, A to D "flash" converter available as a single IC (integrated cirucit). Several different types of such A/D converters are available from Burr-Brown, one of which is the ADC 600.

Compression of the digital data defining a video frame and the reverse process (decompression) are accomplished by compressor/decompressor 26. Various algorithms may be employed in the compression process which enable the representation of a series of numbers by a reduced number of digits. As an example, compression algorithms like CCITT Group IV may be used. Existing compression algorithms, like CCITT Group IV, are available on a single integrated circuit. One example of an appropriate compression/decompression circuit on a single integrated circuit is the AMD (Advanced Micro Devices) 7971. The 7971 is described in the Am7971A data sheet, published by AMD in 1988, and incorporated herein by reference.

In one optional embodiment, to further reduce the amount of memory required to store a program the compression algorithm can simply record data corresponding to only those pixels which change color from one frame to the next. This results in considerable memory space savings, since not all pixels change color each frame. Basing calculation upon 10% of the pixels changing from one frame to the next, it is estimated that memory requirements using this technique are cut by about 90%. It is also estimated that on the average, the CCITT Group IV algorithm can cut memory requirements by another 95%. Thus, if no data compression technique is used, it would take approximately 51.03 gigabytes to store a 2 hour movie, but using the above compression techniques, it is estimated that memory 13 will require only 250 megabytes.

Controller 27 handles timing and aids in the communication between the different elements of VCU 12, and between VCU 12, AVRU 11 and memory 13.

In one embodiment, the audio portion of the program is periodically sampled and digitized by digital to analog conversion In one embodiment, this is done at a sample rate of 88,000/second, one byte per sample, to yield CD quality sound. The sampling rate could be dropped to reduce memory requirements. Also, the audio data can be compressed with conventional algorithms, e.g., a Fibonacci delta compression algorithm.

The process of converting either from analog to digital or from digital to analog requires memory for intermediate storage. Random Access Memory(RAM) 29 serve in this capacity. For this purpose either a DRAM (Dynamic RAM) or a SRAM (static RAM) may be employed. An example of a DRAM is the TI (Texas Instruments) TMX4C1024; an example of a SRAM is the INMOS IMS-1203. RAM 29 should have sufficient capacity to store at least two full uncompressed frames (e.g., about 472 KB).

The CPU (Central Processing Unit) 28 is a microprocessor which controls the digitization process of VCU 12. CPU 28 works with controller 27 to control and communicate with the other elements of the VCU. There are numerous commercially available microprocessors that are appropriate for this application. The Intel 80286, Intel 80386, Motorola 68020, and Motorola 68030 are examples. A more complete description of the microprocessors can be found in the Oct. 27, 1988 issue of *Electronic Design News* (EDN), pages 231 and 242, or in the applicable data sheets.

Controller 27, CPU 28 and RAM 29 serve in the same manner during the reverse processes, i.e., decompression and digital to analog conversion. Decompression is first accomplished in compressor/decompressor 26. The decompressed digital signal is then converted to an analog signal by digital to analog converter (DAC) 24 (assuming its destination requires an analog form). In the course of converting the decompressed signals from the VCU 12 for use by the AVRU 11 the signals are synchronized by the time base generator (TBG) or corrector 48. TBG 48 can be by passed by a shunt switch 48' for the purpose of transmitting either compressed or decompressed signals from VCU 12 directly to the AVRU 11 in an uncorrected time based mode.

DAC 25 provides the inverse of the function performed by A/D converter 24. DAC 25 is a high-speed, high accuracy digital to analog converter. An example of such a converter is the Burr-Brown DAC60 digital to analog converter.

Different types of memory technologies are adaptable for use in memory 13. As mentioned earlier, DRAM and SRAM semiconductor memories are commonly used for applications of this type and are readily available.

One type of random access memory is CMOS (Complimentary Metal Oxide Semiconductor). The CMOS memory has the advantage of a relatively low power requirement and is readily adaptable for use of battery backup for semi-permanent data storage. Another type of memory is the above mentioned optical disc memories.

Emerging memory technologies may also prove advantageous with capabilities for mass data storage in even smaller physical dimensions.

Digital Control Unit (DCU) 14 comprises a CPU (Central Processor Unit) 31, a ROM (Read Only Memory) 32 and a controller 32. DCU 14 is responsible for all of the digital editing processes. Through the use of DCU 14, video segments may be edited and rearranged. Thus, one may use DCU 14 to rearrange the scenes in a movie, alter the movie sound track, etc.

In addition, a program may be edited, one frame at a time, by changing the contrast, brightness, sharpness, colors, etc. (Alteration of the contrast, brightness, sharpness and colors can be automated as well.) Images could be rotated, scaled (i.e., made larger or smaller), etc. In addition, pixel by pixel editing can be accomplished by DCU 14, e.g., in a manner similar to the PC paint program. Similar editing features can be incorporated for the audio portion of each program. In one embodiment, a display such as a flat panel video display (not shown) is built into the VCR-ET. A user interface control panel of DCU 14 allows a user to select a desired frame number from a menu on the display The VCR-ET then displays a strip of frames (including several frames before and after the selected frame). The user can delete frames in a strip, select a point where other frames are to be inserted into the program, or enhance different frames. A light pen or mouse ca be used to select individual frames in a strip.

Instead of incorporating a flat display into VCR-ET 10, in another embodiment, a television coupled to output lead 42 of RF modulator 19 can be used during editing.

CPU 31 is a microprocessor of the type described in connection with the CPU 28 of VCU 12. Controller 33 is a integrated circuit which handles the timing and aids in communication between DCU 14 and memory 13. ROM 32 holds the necessary step-by-step editing programs which are installed at the factory. A currently available example of a suitable ROM for this application is the Texas Instruments part TMS47256. CPU 31 and controller 33 together control the editing process as they execute the programs stored in ROM 32.

The VCU 12, memory 13 and DCU 14 communicate with each other via a high speed data bus 34. The high speed data bus is required in order to meet bandwidth requirements. Examples of suitable data bus devices are Motorola's VME bus, Intel's Multibus and the Optobuss (U.S. Pat. No. 4,732,446).

A video line or camera input line 15 is provided to enable VCR-ET 10 to receive an input signal from a source such as a television camera, a conventional VCR, a television tuner, or another VCR, etc. The signals received at input line 15 are typically carried by a coaxial cable and are in the form of a standard television composite signal. As used throughout this specification, the words "standard television composite signal" or its acronym STCS shall be read to mean any one of the following: NTSC, PAL, SECAM, HDTV, or any American or European broadcast signal standards. An NTSC composite signal is defined as the analog signal that carries the chrominance (color), luminance (brightness), synchronization (timing) and audio signals that make up the video signals received an displayed by television and video cassette recorders. These four components are combined into one signal by modulating the components in different ways. (Amplitude modulation and phase modulation are examples.) The standard video line signal is such a composite signal and may be received at input line 15 from one of the above-mentioned sources.

TV RF tuner input port 16 also supplies a composite signal as described in regard to video input line 15. The difference is that this signal is received from an antenna or cable TV coaxial cable. To receive such a signal, tuner 16 is capable of being set or tuned to receive the desired carrier frequency or television channel.

Selector switch 35 is provided to select either video input line 15 or TV RF tuner 16 as an input signal source to AVRU 11.

Auxiliary digital input port 17 is employed to receive any acceptable digital signal such as computer-generated video signal or as may be supplied by another VCR-ET. This signal, for example, may be an RGB video signal such as that delivered to computer monitors, or it may be a digitized audio signal. (As mentioned above, an RGB signal is a signal which communicates the strength of the red, green and blue color components for the pixels that make up each video frame.) Switch 36 selects whether the digital video/audio input signal is chosen from auxiliary digital input port 17. Switch 36 supplies the selected signal to high speed data bus 34 which carries the signals in digital form.

Fiber optic port 18 incorporates a fiber optic transceiver/receiver. Port 18 has a capability for transforming fiber optic (light) signals to electrical signals or for transforming electrical signals to fiber optic signals. Port 18 thus provides a capability for two-way communication between high speed data bus 34 and a fiber optic signal line. The incorporation of fiber optic port 18 in the VCR-ET provides a capability for receiving audio/video signals from or delivering audio/video signals to the fiber optic line such as a fiber optic telephone line. The fiber optic line carries digital signals in the form of light waves over great distances with a high degree of accuracy and reliability and at a high speed (e.g., about 200 megabytes/second). The VCR-ET can receive a video program at an accelerated rate via fiber optic port 18, e.g., from a variety of sources. For example—a video program may be communicated at an accelerated rate from the first VCR-ET to a second VCR-ET in less time than it would take to view the program. Thus, it is not necessary to access the optical fiber for long periods of time to transmit a long video program.

It is also envisioned that in the future, a video library may be established which downloads video programs at an accelerated rate via optical fibers to a subscriber's VCR-ET.

Switch 37 is provided to select connection to the fiber optic input/output port 18. An OFF or open position is provided. The selected signal is delivered to or supplied from high speed data bus 34.

Analog output signals from AVRU 11 are delivered to the common terminal 38 of a selector switch 39. When set to position A, switch 39 delivers the output signal of AVRU 11 directly to a video output line 41 as a standard STCS composite signal; when set to position B switch 39 delivers the output of VRU 11 to the input of RF modulator 19. Modulator 19 converts the video signal to an RF-modulated composite signal for delivery to such devices as televisions and conventional VCR's. These types of devices play back the video program on a particular frequency channel (such as channel 4) on the television. Delivery to the television or VCR is via RF output line 42.

Digital output signals from VCR-ET 10 may be dispatched from high speed data bus 34 via line 43 to input leads of RGB converter 21 and audio-video transmitter/receiver 22.

RGB converter 21 converts the STCS signal into an RGB signal as required by computer monitors and similar display devices. The converted signal is received by a display device connected to RGB converter output line 44.

VCR-ET 10 includes audio/video transmitter/receiver 22 which is typically a modem. Advantageously, the modem may be used to communicate an audio/video program over conventional phone lines in a manner similar to that described above with respect to optical fibers. The term modem is derived directly from its functionality as a modulator-demodulator which allows transfer of the audio/video signal over the standard telephone line. Modems are commonly available for computers and are currently available in the form of a single integrated circuit. As an example, Sierra Semiconductor offers a 2400 baud single chip modem under its part number SC111006. Representative manufacturers of these single modem IC's can be found in the Apr. 14, 1988 issue of Engineering Design News (EDN), pages 124–125. Some of these single modem IC's have the added capability of generating the tones for dialing a phone number. The destination phone number ma be entered by means of an optional keyboard/keypad 45 incorporated in the video recorder 10 of the invention. Output port 46 of transmitter/receiver 22 connects directly to the telephone line. (It is noted that the band width of a conventional phone line is at present much narrower than the signal band width of an optical fiber, and thus the data transmission rate on telephone lines is much slower than the transmission rate for an optical fiber. Accordingly, the time required to communicate a video program over a conventional phone line may exceed the time it takes to view the program.)

The application and utilization of the VCR-ET ma include a number of forms or operating modes.

In its first and simplest operating mode, AVRU 11 may be operated in the manner of a conventional VCR with signals from an antenna being received by tuner 16 and recorded directly on media 23 in analog form. At the same time the received program may be viewed on the television screen with the television connected at video output terminal 41. An optional signal source for this type of operation is the video line or camera input line 15 selectable by switch 35.

In a second operating mode a program stored on media 23 of AVRU 11 may be played back and viewed on the connected television set.

When it is desired to copy a program from one recording media to another, the recording media holding the desired program is installed in the AVRU. The recording media is then played back with optional viewing on a connected television set o other TV monitor or listening through speakers (as appropriate). As the recording media is played back, the analog signals from the recording media (video and/or audio) are dispatched to VCU 12 via connection 47. The analog signals are converted to digital signals by ADC 24, compressed by compressor/decompressor 26 and the compressed digital signals are stored in memory 13. The foregoing operations are accomplished under the control of controller 27 and CPU 28. RAM 29 is used for interim data storage during this process. Once the complete video/audio program has been stored in memory 13, the recording media from which the stored program has just been read is replaced by blank recording media upon which the stored program is to be copied. CPU 28 in cooperation with controller 27 and RAM 29 then executes the decompression and digital to analog conversion of the program stored in memory 13, decompression taking place in compressor/decompressor 26, and digital to analog conversion being accomplished by DAC 25. The resulting analog program is stored on the blank recording media which constitutes media 23 of AVRU 11.

During the foregoing copying procedures, DCU 14 may be utilized for editing operations. As the program is being read from the first or original recording media, it is simultaneously viewed on the TV screen, or listened to by means of an audio monitor, converted to digital signals, compressed and stored in memory 13. Once the digital audio/video program is stored in memory 13, editing is accomplished by the user through control of DCU 14, by means of a control panel (not shown) coupled to DCU 14. If desired, additional audio/video signals may be simultaneously entered into memory 13 and added to those received from VCU 12. The additional signals ma be introduced from auxiliary digital input port 17 or from fiber optic input/output port 18 and may comprise video captions for superimposed position upon the stored video images, or they may be audio commentaries to be added to silent video presentations. In addition, as mentioned above, the order in which various segments appear in the video programs ma be altered. Certain undesired segments, such as TV commercials, may be removed. This editing operation is accomplished under the control of DCU 14.

In still another operating mode a program stored in media 23 of AVRU 11 or being received by AVRU 11 from input line 15 (as from a video camera) may be digitized and compressed by VCU 12 and routed via bus 34, to memory 13. The data from memory 13 is then routed to line 43, transmitter/receiver 22 and to a telephone line. At the other end of the telephone line the signals received are processed by another VCR-ET. As indicated above, conventional nonoptical telephone lines do not typically support high data transmission rates at the present time. Accordingly, even compressed data may require more time to transmit over conventional phone lines than it would take to view the actual video program.

Once received in the second VCR-ET's memory 13, the digitized program ca then either be viewed directly from memory or transferred to storage medium 23, either in its entirety or in random segments, based on user preference.

In the case of video camera input at input 15 the transmitted signals may comprise a live transmission. Alternatively the transmitted program may be derived from a program stored on media 23 of AVRU 11. In this case the stored analog program is again decoded, digitized, compressed and transmitted via bus 34 to memory 13. The data in memory 13 is then communicated via line 43 and transmitter/receiver 22 to telephone lines.

It follows, of course, that digitized video and audio signals from the remote VCR-ET at the far end of the telephone line may be received at line 46, entered into memory 13 via transmitter/receiver 22, converted to analog signals by VCU 12, and recorded on media 23 and then viewed, if desired, on a television set connected at output 41.

As mentioned earlier, when any of the foregoing operations entail the processing of unmodulated video signals, such signals must first be processed by RF modulator 19 before they can be accepted by devices such as a conventional VCR or television set; when the monitoring means is a computer monitor or a similar display device the signals are processed by RGB converter 21.

All of the foregoing operations are performed with enhanced quality and efficiency by virtue of the digital, rather than analog, storage and transmission modes and the compressed data storage mechanism, with additional advantages of improved cost and reliability afforded in the case of tape to tape (or other media to media) program transfers by virtue of the requirement for only a single tape deck or other storage device.

All of the foregoing operations, to the extent they relate to the editing, playback, reception and/or transmission of video signals are also analogous to the VCR-ET's capabilities with regard to analog or digital signals containing only audio material.

An improved audio/video recorder with significantly expanded functional capabilities is thus provided in accordance with the stated objects of the invention and although but a single embodiment of the invention has been illustrated and described, it will be apparent to those skilled in the art that various changes and modifications may be made therein without departing from the spirit of the invention or from the scope of the appended claim. For example, the VCR-ET can be constructed so as to be portable. Thus, it could be carried to a location along with a video camera where it is desired to record a program, and then taken to another location where it is used to edit the program. Other modifications will be apparent to those skilled in the art in light of the present specification.

What is claimed is:

1. An audio/video transceiver apparatus comprising:
input means for receiving audio/visual source information;
compression means, coupled to said input means, for compressing said audio/video source information into a time compressed representation thereof having an associated time period that is shorter than a time period associated with a real time representation of said audio/video source information;
random access storage means, coupled to said compression means, for storing the time compressed representation of said audio/video source information; and output means, coupled to said random access storage means, for receiving the time compressed audio/video source information stored in said random access storage means for transmission away from said audio/video transceiver apparatus.

2. An audio/video transceiver apparatus as in claim 1 further comprising editing means, coupled to said random access storage means, for editing the time compressed representation of said audio/video source information stored in said random access storage means and for restoring the edited time compressed representation of said audio/video source information in said random access storage means; and wherein said output means is operative for receiving the edited time compressed representation of said audio/video source information stored in said random access storage means for transmission away from said audio/video transceiver apparatus.

3. An audio/video transceiver apparatus as in claim 2 further comprising monitor means for enabling the user to selectively identify the time compressed representation of said audio/video source information stored in said random access storage means during editing.

4. An audio/video transceiver apparatus as in claim 1 wherein said output means comprises a fiber optic output port for coupling said audio/video transceiver apparatus to a fiber optic transmission line.

5. An audio/video transceiver apparatus as in claim 1 wherein said output means comprises a modem for coupling said audio/video transceiver apparatus to a telephone transmission line.

6. An audio/video transceiver apparatus as in claim wherein said random access storage means comprises an optical disc.

7. An audio/video transceiver apparatus as in claim 1 wherein said random access storage means comprises a semiconductor memory.

8. An audio/video transceiver apparatus as in claim 1 wherein:
said audio/video source information comprises analog audio/video source information;
said audio/video transceiver apparatus further comprises analog to digital converter means for converting said analog audio/video source information to corresponding digital audio/video source information;
said compression means is operative for compressing said corresponding digital audio/video source information into a digital time compressed representation thereof having an associated time period that is shorter than a time period associated with a real time representation of said digital audio/video source information; and
said random access storage means is operative for storing said digital time compressed representation of said corresponding digital audio/video source information.

9. An audio/video transceiver apparatus as in claim 1 wherein:
said audio/video source information comprises digital audio/video source information;
said compression means is operative for compressing said digital audio/video source information into a digital time compressed representation thereof having an associated time period that is shorter than a time period associated with a real time representation of said digital audio/video source information; and
said random access storage means is operative for storing said digital time compressed representation of said digital audio/video source information;

10. An audio/video transceiver apparatus as in claim 8 wherein said input means is coupled to an external television camera and said analog audio/video source information comprises information received from said external television camera.

11. An audio/video transceiver apparatus as in claim 8 wherein said input means is coupled to an external analog video tape recorder and said analog audio/video source information comprises information received from said external analog video tape recorder.

12. An audio/video transceiver apparatus as in claim 8 wherein said input means is coupled to an external television RF tuner and said analog audio/video source information comprises information received from said external television RF tuner.

13. An audio/video transceiver apparatus as in claim 8 wherein said input means comprises television RF tuner means coupled to an external television antenna and said analog audio/video source information comprises information transmitted by a remotely located television transmitter.

14. An audio/video transceiver apparatus as in claim 8 wherein said input means comprises television RF tuner means coupled to an external cable television system and said analog audio/video source information comprises information received from said external cable television system.

15. An audio/video transceiver apparats is in claim 9 wherein said input means is coupled to an external computer and said digital audio/video source information comprises computer-generated audio/video information.

16. An audio/video transevier apparatus as in claim 9 wherein said input means comprises a fiber optic input port coupled to a fiber optic transmission line and said digital audio/video source information comprises information received over said fiber optic transmission line.

17. An audio/video transceiver apparatus comprising:
input means for receiving audio/video source information as a time compressed representation thereof, said time compressed representation of said audio/video source information being received over an associated burst time period that is shorter than a real time period associated with said audio/video source information;
random access storage means, coupled to said input means, for storing the time compressed representation of said audio/video source information received by said input means; and
output means, coupled to said random access storage means, for receiving the time compressed representation of said audio/video source information stored in said random access storage means for transmission away from said audio/video transceiver apparatus.

18. An audio/video transceiver apparatus as in claim 17 wherein:
said input means comprises a fiber optic input port;
said input means is coupled, via a fiber optic transmission line, to a video library, said video library storing a multiplicity of items of audio/video source information in said time compressed representation for selective retrieval, in said associated burst time period over said fiber optic transmission line, by the user.

19. An audio/video transceiver apparatus as in claim 17 in combination with a video library, coupled via a communication link with said audio/video transceiver apparatus, said video library storing a multiplicity of items of audio/video source information in said time compressed representation for selective retrieval, in said associated burst time period over said communication link.

20. An audio/video transceiver apparatus as in claim 1 further comprising:
 decompression means, coupled to said random access storage means, for selectively decompressing said time compressed representation of said audio/video source information stored in said random access storage means; and
 editing means, coupled to said random access storage means and decompression means, for editing said selectively decompressed time compressed representation of said audio/video source information, and for storing said edited selectively decompressed time compressed representation of said audio/video source information in said random access storage means.

21. An audio/video transceiver apparatus as in claim 1 further comprising:
 decompression means, coupled to said random access storage means, for selectively decompressing said time compressed representation of said audio/video source information stored in said random access storage means; and
 editing means, coupled to said random access storage means an decompression means, for editing said selectively decompressed time compressed representation of said audio/video source information;
 wherein said compression means is operative for recompressing the edited selectively decompressed time compressed representation of said audio/video source information; and
 wherein said random access storage means is operative for storing the recompressed selectively decompressed time compressed representation of said audio/video source information.

22. An audio/video transceiver apparatus as in claim 1 further comprising:
 decompression means, coupled to said random access storage means, for selectively decompressing the time compressed representation of said audio/video source information stored in said random access storage means; and
 monitor means for enabling the user to view the selectively decompressed time compressed representation of said audio/video source information.

23. An audio/video transceiver apparatus as in claim 8 further comprising:
 decompression means, coupled to said random access storage means, for selectively decompressing the digital time compressed representation of said corresponding digital audio/video source information stored in said random access storage means; and
 editing means, coupled to said random access storage means and decompression means, for editing the decompressed digital time compressed representation of said corresponding digital audio/video source information and for then storing the edited decompressed digital time compressed representation of said corresponding digital audio/video source information in said random access storage means.

24. An audio/video transceiver apparatus as in claim 23 further comprising monitor means for enabling the user to selectively view the decompressed digital time compressed representation of said corresponding digital audio/video source information during editing.

25. An audio/video transceiver apparatus as in claim 8 further comprising:
 decompression means, coupled to said random access storage means, for selectively decompressing the digital time compressed representation of said corresponding digital audio/video source information stored in said random access storage means; and
 monitor means, coupled to said decompression means, for enabling the user to selectively view the decompressed digital time compressed representation of said corresponding digital audio/video source information.

26. An audio/video transceiver apparatus as in claim 9 further comprising:
 decompression means, coupled to said random access storage means, for selectively decompressing the digital time compressed representation of said digital audio/video source information stored in said random access memory means; and
 editing means, coupled to said random access storage means and decompression means, for editing the decompressed digital time compressed representation of said digital audio/video source information;
 said random access storage means thereafter being operative for storing the edited decompressed digital time compressed representation of said digital audio/video source information in said random access storage means.

27. An audio/video transceiver apparatus as in claim 26 further comprising monitor means for enabling the user to selectively view the decompressed digital time compressed representation of said digital audio/video source information during editing.

28. An audio/video transceiver apparatus as in claim 9 further comprising:
 decompression means, coupled to said random access storage means, for selectively decompressing the digital time compressed representation of said digital audio/video source information stored in said random access memory means; and
 monitor means, coupled to said decompression means, for enabling the user to selectively view the decompressed digital time compressed representation of said digital audio/video source information.

29. An audio/video transceiver apparatus as in claim 8 further comprising a video tape recorder for providing said analog audio/video source information.

30. An audio/video information transfer network comprising:
 a plurality of audio/video transceivers, coupled via one or more communication links, each of said audio/video transceivers comprising;
 input means for receiving audio/video source information;
 compression means, coupled to said input means, for compressing said audio/video source information into a time compressed representation thereof having an associated burst time period that is shorter than a time period associated with a real time representation of said audio/video source information;

random access storage means, coupled to said compression means, for storing the time compressed representation of said audio/video source information; and output means, coupled to said random access storage means and to one of said one or more communications links, for receiving the time compressed format representation of said audio/video source information stored in said random access storage means for transmission in said burst time period to another one of said plurality of audio/video transceivers.

31. An audio/video information transfer network as in claim 30 wherein said input means of one of said plurality of audio/video transceivers comprises a fiber optic input port, said output means of another one of said plurality of audio/video transceivers comprises a fiber optic output port, and one of said one or more communications links comprises a fiber optic transmission line coupled between said fiber optic input port and said fiber optic output port.

32. An audio/video information transfer network as in claim 30 wherein said output means of one of said plurality of audio/video transceivers comprises a modem and one of said one or more communications links comprises a telephone transmission line.

33. An audio/video information transfer network as in claim 30 wherein said random access storage means comprises an optical disc memory.

34. An audio/video information transfer network as in claim 30 wherein said random access storage means comprises a semiconductor memory.

35. An audio/video information transfer network as in claim 30 wherein said random access storage means of one of said plurality of audio/video transceivers stores a library comprising a multiplicity of items of audio/video source information in said time compressed representation for selective transmission in said associated burst time period to another on of said audio/video transceivers.

36. An audio/video information transfer network as in claim 30 wherein at least one of said audio/video transceivers further comprises recording means, including a removable recording medium, coupled to said random access storage means, for storing the time compressed representation of said audio/video source information stored in said random access storage means onto said removable recording medium.

37. An audio/video information transfer network as in claim 30 wherein at least one of said audio/video transceivers further comprises:

decompression means, coupled to said random access storage means, for decompressing the time compressed representation of said audio/video source information stored in said random access storage means; and recording means, including a removable recording medium coupled to said decompression means, for storing the decompressed time compressed format representation of said audio/video source information onto said removable recording medium.

38. An audio/video information transfer network as in claim 36 wherein said recording means comprises a video tape recorder and said removable recording medium comprises magnetic tape.

39. An audio/video information transfer network as in claim 37 wherein said recording means comprises a video tape recorder and said removable recording medium comprises magnetic tape.

40. An audio/video information transfer network as in claim 36 wherein said recording means comprises a write once read many (WORM) optical disc drive and said removable recording medium comprises one or more WORM discs.

41. An audio/video information transfer network as in claim 37 wherein said recording means comprises a write once read many (WORM) optical disc drive and said removable recording medium comprises one or more WORM discs.

42. An audio/video information transfer network as in claim 36 wherein said recording means comprises an erasable optical disc drive and said hard copy storage medium comprises one or more erasable optical discs.

43. An audio/video information transfer network as in claim 37 wherein said recording means comprises an erasable optical disc drive and said hard copy storage medium comprises one or more erasable optical discs.

44. An audio/video transceiver apparatus as in claim 1 further comprising recording means, including a removable recording medium coupled to said random access storage means, for storing the time compressed representation of said audio/video source information stored in said random access storage means onto said removable recording medium.

45. An audio/video transceiver apparatus as in claim 2 further comprising recording means, including a removable recording medium, coupled to said random access storage means, for storing the edited time compressed representation of said audio/video source information stored in said random access storage means onto said removable recording medium.

46. An audio/video transceiver apparats as in claim 45 further comprising monitor means for enabling the user to selectively view the time compressed representation of said audio/video source information stored on said removable recording medium.

47. An audio/video transceiver apparatus as in claim 17 further comprising recording means, including a removable recording medium, coupled to said random access storage means, for storing the time compressed representation of said audio/video source information stored in said random access storage means onto said removable recording medium.

48. An audio/video transceiver apparatus as in claim 2 further comprising recording means, including a removable recording medium, coupled to said random access storage means, for storing the edited decompressed time compressed representation of said audio/video source information stored in said random access storage means.

49. An audio/video transceiver apparatus as in claim 1 further comprising:

decompression means, coupled to said random access storage means, for selectively decompressing the time compressed representation of said audio/video source information stored in said random access storage means; and recording means, including a removable recording medium, coupled to said decompression means, for storing the selectively decompressed tome compressed representation of said audio/video source information stored in said random access storage means.

50. An audio/video transceiver apparatus as in claim 22 further comprising:

recording means, including a removable recording medium, coupled to said decompression means, for storing the selectively decompressed tome compressed representation of said audio/video source information on said hard copy storage medium; and wherein said monitor means is operative for enabling the user to view the selectively decompressed time compressed representation of said audio/video source information stored on said removable recording medium.

51. An audio/video transceiver apparatus as in claim 9 further comprising CD-ROM means for providing said digital audio/video source information.

52. An audio/video transceiver apparats as in claim 9 further comprising erasable optical disc means for providing said digital audio/video source information.

53. An audio/video transceiver apparatus as in claim 17 wherein:

said input means comprises television RF tuner means; and said audio/video source information comprises a time compressed representation thereof transmitted by a remotely located television transmitter.

54. An audio/video transceiver apparatus as in claim 1 further comprising external video tape recorder means, coupled to said output means, for storing the time compressed representation of said audio/video source information stored in said random access storage means onto magnetic tape.

55. An audio/video transceiver apparatus as in claim 2 further comprising external video tape recorder means, coupled to said output means, for storing the edited time compressed representation of said audio/video source information stored in said random access storage means onto magnetic tape.

56. An audio/video transceiver apparatus as in claim 17 further comprising external video tape recorder means, coupled to said output means, for storing the time compressed representation of said audio/video source information stored in said random access storage means onto magnetic tape.

57. An audio/video transceiver apparatus as in claim 52 further comprising external video tape recorder means, coupled to said output means, for storing the edited decompressed time compressed representation of said audio/video source information stored in said random access storage means onto magnetic tape.

58. An audio/video transceiver apparatus as in claim 1 further comprising:

decompression means, coupled to said random access storage means, for selectively decompressing the time compressed representation of said audio/video source information stored in said random access storage means; and external video tape recorder means, coupled to said output means, for storing the selectively decompressed time compressed representation of said audio/video source information stored in said random access storage means.

59. An audio/video transceiver apparatus as in claim 22 further comprising external video tape recorder means, coupled to said output means, for storing the selectively decompressed time compressed representation of said audio/video source information onto magnetic tape.

60. An audio/video transceiver apparatus comprising:

input means for receiving analog and/or digital audio/video source information;

analog to digital converter means for converting analog audio/video source information received at said input means to corresponding digital audio/video source information;

digital to analog converter means for converting digital audio/video source information received at said input means to corresponding analog audio/video information;

compressor/decompressor means for compressing digital audio/video source information received at said input means or said corresponding digital audio/video source information received from said analog to digital converter means into a time compressed representation of said digital or corresponding digital audio/video source information, said time compressed representation having an associated time period that is shorter than a time period associated with a real time representation of said digital or corresponding digital audio/video source information, said compressor/decompressor means being further operative for decompressing said time compressed representation into a decompressed real time representation of said digital or corresponding digital audio/video source information;

central processing unit means for controlling operation of said compressor/decompressor means;

random access storage means for storing said time compressed representation of said digital or corresponding digital audio/video source information and for storing said decompressed real time representation of said digital or corresponding digital audio/video source information;

controller means for enabling communication between said compressor/decompressor means, said central processing unit means, and said random access memory means; and output means for receiving said time compressed representation of said digital or corresponding digital audio/video source information stored in said random access storage means for transmission away from said audio/video transceiver apparatus.

61. An audio/video transceiver apparatus as in claim 60 further comprising time bas generator means for supplying timing information for association with said time compressed representation of said digital or corresponding digital audio/video source information.

62. An audio/video transceiver apparatus as in claim 60 further comprising audio/video recording means, including a recording medium, for recording said analog or corresponding analog audio/video source information onto said recording medium.

63. An audio/video transceiver apparatus as in claim 60 further comprising audio/video recording means, including a recording medium, for recording said digital or corresponding digital audio/video source information onto said recording medium.

64. An audio/video transceiver apparatus as in claim 62 wherein said recording medium comprises magnetic tape.

65. An audio/video transceiver apparatus as in claim 63 wherein said recording medium comprises magnetic tape.

66. An audio/video transceiver apparatus as in claim 63 wherein said recording medium comprises a CD-ROM.

67. An audio/video transceiver apparatus as in claim 63 wherein said recording medium comprises a WORM optical disc.

68. An audio/video transceiver apparatus as in claim 63 wherein said recording medium comprises an erasable optical disc.

69. An audio/video transceiver apparatus as in claim 60 further comprising audio/video recording and playback means coupled to said input means for providing said analog and/or digital audio/video source information.

70. An audio/video transceiver apparatus as in claim 60 further comprising high speed bus means coupled to said input means, and wherein said input means comprises auxiliary digital input means for receiving said digital audio/video source information.

71. An audio/video transceiver apparatus as in claim 70 wherein said high speed bus means comprises an optical bus.

72. An audio/video transceiver apparatus as in claim 60 further comprising high speed bus means coupled to said input means, and wherein said input means comprises fiber optic input means for receiving said digital audio/video source information.

73. An audio/video transceiver apparatus as in claim 60 further comprising high speed bus means, and wherein said analog to digital converter means, digital to analog converter means, compressor/decompressor means, central processing unit means, and controller means are coupled to said random access storage means via said high speed bus means.

74. An audio/video transceiver apparatus as in claim 60 further comprising:
digital control unit means, said digital control unit means comprising:
additional central processing unit means;
read-only memory means coupled to said additional central processing unit means for storing microinstructions defining a plurality of selected editing functions; and
additional controller means for enabling communication between said additional central processing unit means and said read-only memory means;
said additional central processing unit means being operative for selectively executing the microinstructions stored in said read-only memory means to perform one or more of said plurality of selected editing functions.

75. An audio/video transceiver apparatus as in claim 74 wherein said digital control unit means is coupled to said random access storage means.

76. An audio/video transceiver apparatus as in claim 73 further comprising RGB converter means for converting information stored in said random access storage means to an RGB format, and wherein said output means comprises RGB output means for receiving RGB format information from said RGB converter means.

77. An audio/video transceiver apparatus as in claim 73 wherein said output means comprises audio/video transmitter/receiver means coupled to said high speed bus for receiving said time compressed representation of said digital or corresponding digital audio/video source information stored in said random access storage means for transmission away from said audio/video transceiver apparatus.

78. An audio/video transceiver apparatus as in claim 77 wherein said audio/video transmitter/receiver means comprises a modem for coupling to a telephone transmission line.

79. An audio/video transceiver apparatus as in claim 77 wherein said audio/video transmitter/receiver means comprises a fiber optic transceiver for coupling to a fiber optic transmission line.

80. An audio/video transceiver apparatus as in claim 1 further comprising editing means, coupled to said random access storage means, for editing said time compressed representation of said audio/video source information and for then storing the edited time compressed representation of said audio/video source information in said random access storage means.

* * * * *